Nov. 1, 1927.
J. B. HAWLEY, JR
1,647,518
SHOCK ABSORBER AND THE LIKE FOR VEHICLES
Filed Feb. 28, 1923
2 Sheets-Sheet 1
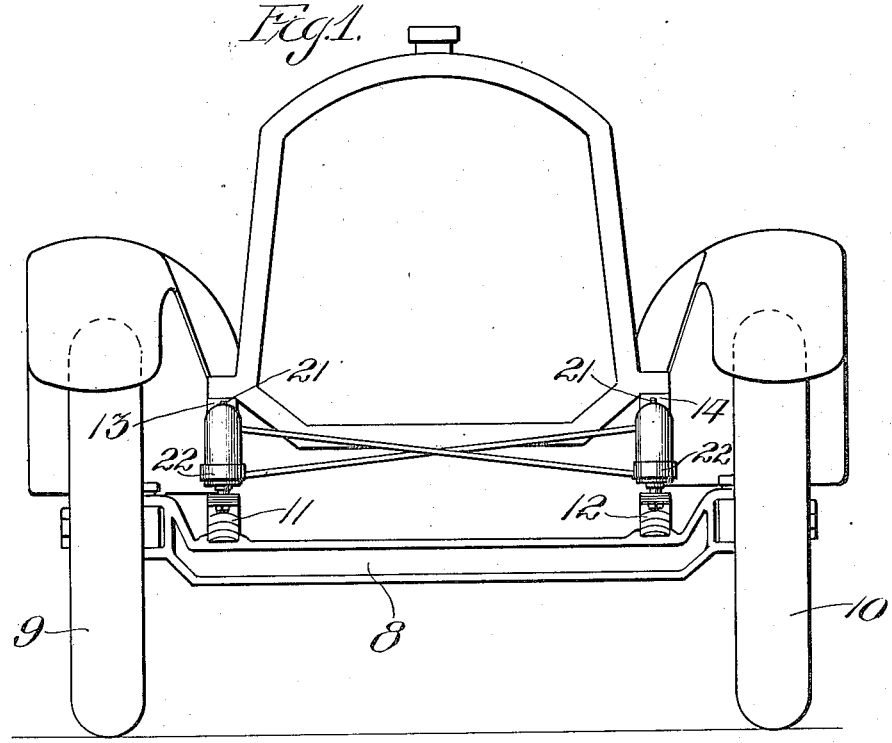
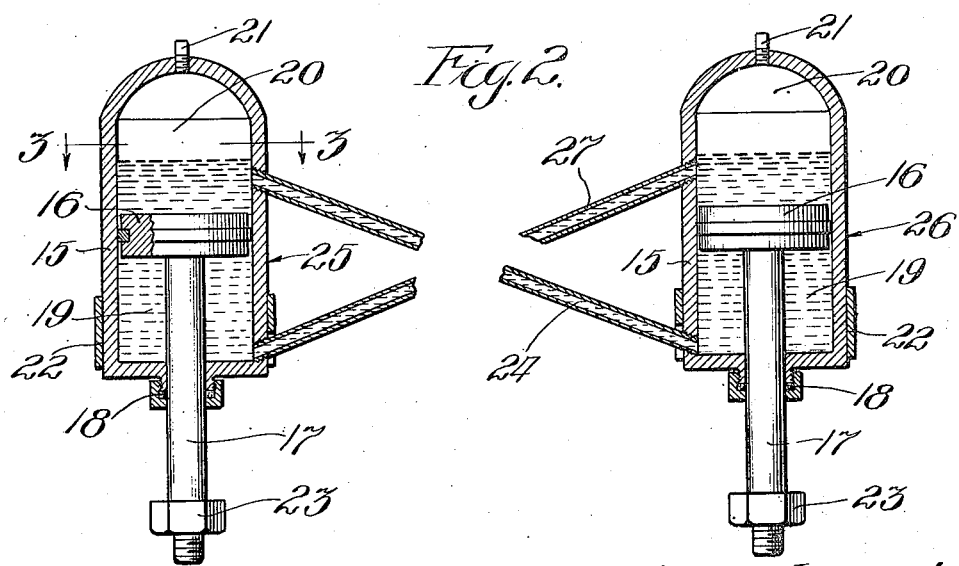
Inventor:
John B. Hawley, Jr.

Nov. 1, 1927.　　　　　　　　　　　　　　　　　　　　1,647,518
J. B. HAWLEY, JR
SHOCK ABSORBER AND THE LIKE FOR VEHICLES
Filed Feb. 28, 1923　　　　2 Sheets-Sheet 2
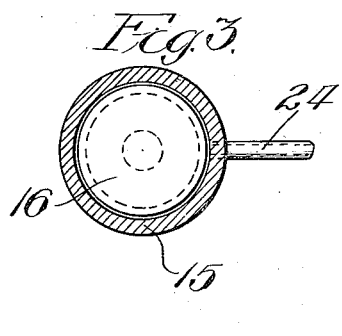
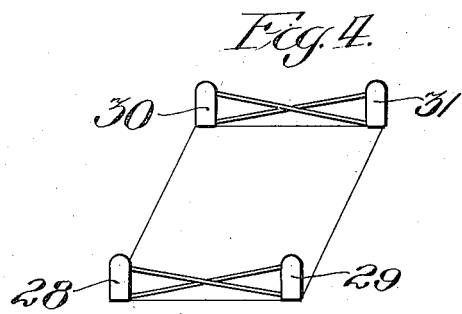
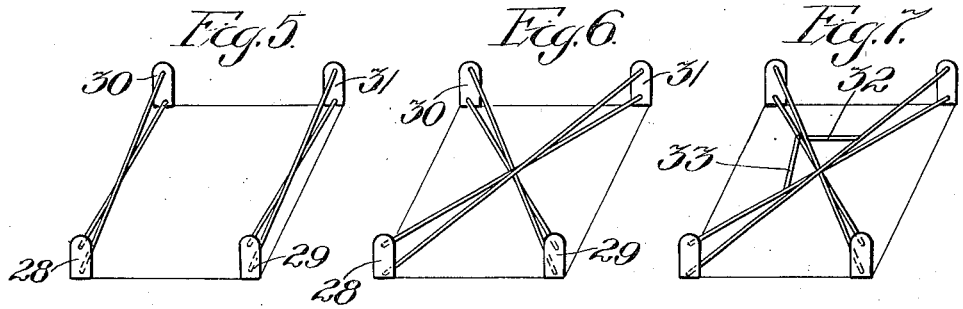
Inventor:
John B. Hawley, Jr.
by　　　　　　Attys.

Patented Nov. 1, 1927.

1,647,518

UNITED STATES PATENT OFFICE.

JOHN B. HAWLEY, JR., OF COLORADO SPRINGS, COLORADO, ASSIGNOR TO HAWLEY INVENTIONS, INC., A CORPORATION OF DELAWARE.

SHOCK ABSORBER AND THE LIKE FOR VEHICLES.

Application filed February 28, 1923. Serial No. 621,738.

This invention has to do with certain improvements in shock absorbers and the like for vehicles, such as automobiles, trucks, etc. One of the objects of the invention is to provide a shock absorber of such construction that it will give a very complete absorbing of the energy of the shock so as to improve the riding qualities of the vehicle. In this connection, a further object is to provide a construction such that the shock of the rebound will be largely eliminated.

A further object of the invention is to provide an arrangement such that a shock delivered to one corner of the vehicle will be substantially equalized or balanced to one or more of the other corners of the vehicle, so that side sway will be largely eliminated. In this connection, a further object is to make provision for an arrangement by means of which the cross connecting between the different corners can be effected in whatever manner will most completely meet the particular needs of the vehicle in question.

Still more in detail a further object of the invention is to provide a shock absorber of the plunger type in which the plunger operates within an oil bath, the oil against the upper and lower faces of any particular plunger being cross connected with the oil against the proper faces of one or more plungers so as to secure the desired balancing as between different corners of the vehicle in order to eliminate side sway and end tilt.

In connection with the foregoing, a further object is to provide an arrangement such that an air cushion may be established in the upper portion of each plunger cylinder, the pressure of the air therein being under the control of the operator. This air cushion in itself will serve to take up and absorb a substantial portion of the initial shock.

Other objects and uses of the invention will appear from a detailed description of the same, which consists in the features of construction and combinations of parts hereinafter described and claimed.

In the drawings:

Figure 1 shows a front view of an automotive vehicle having applied thereto a pair of shock absorbers embodying the features of the present invention;

Fig. 2 shows a vertical section through the shock absorbers of Fig. 1, the central portions of the cross pipes being broken away to shorten up the figure; Fig. 2 being on enlarged scale as compared to Fig. 1;

Fig. 3 shows a horizontal section taken on the line 3—3 of Fig. 2, looking in the direction of the arrows;

Fig. 4 shows in perspective a diagram of the shock absorbers at four corners of the vehicle, the front units being interconnected and the rear units being interconnected;

Fig. 5 shows a view similar to that of Fig 4, with the exception that the front and rear units of each side of the vehicle are interconnected but independently of the other side;

Fig. 6 shows a view similar to Figs. 4 and 5, with the exception that the front unit on each side is interconnected with the diagonally opposite rear units, the parts thus established being independent of each other; and Fig. 7 shows a view similar to that of Fig. 6, with the exception that the parts of units are themselves interconnected.

The vehicle shown in Fig. 1 includes the front axle 8 and the front wheels 9 and 10 of familiar construction. In order to show the manner of application of the shock absorbing units, I have illustrated the springs 11 and 12 resting upon the front axle 8. The side rails 13 and 14 of the vehicle are ordinarily supported directly by the springs 11 and 12.

Each shock absorbing unit of the present invention includes a vertical cylinder 15 within which operates a plunger 16 connected to the downwardly extending piston rods 17 which works through a backing gland 18 in the lower end of the cylinder. Within the cylinder is placed a bath of oil 19, which, however, is insufficient to completely fill the cylinder leaving an air space 20 at the upper end of the cylinder into which air under compression may be introduced through a connection or valve 21. The amount of this air pressure can be adjusted according to the load which the vehicle is intended to carry as well as other conditions such as the nature of the oil used, etc.

When in service each cylinder and its piston rod 17 are connected to opposing portions of the vehicle between which portions the shock is to be absorbed. For example, the cylinder may be connected to a frame bar or rail, and the piston may be connected to one of the springs. This is the application illustrated in Fig. 1. In this case each cylinder is connected to the frame bar by a strap 22, and the plunger is connected to the end of the spring in any convenient manner, including, for example, the nut 23. The units at the corners of the vehicle are to be interconnected in such a way that the oil can interchange between them. For example, in Fig. 2, I have illustrated a pipe 24 connecting the upper portion of the cylinder of the unit 25 with the lower portion of the cylinder of the unit 26, and another pipe 27 connecting the lower portion of the cylinder 25 with the upper portion of the cylinder 26. As a result, upon forcing up the plunger of either unit, oil will be displaced from the upper portion of its cylinder into the lower portion of the companion cylinder, tending to raise its plunger in harmony; and a contrary action will take place when a tendency exists for either plunger to be drawn down, since in such case oil will be displaced from beneath such plunger and forced into the space above the other companion plunger.

It thus appears that interconnections are established by means of which the companion plungers are used to move more or less in unison, so that the shock is distributed between those corners of the vehicle which are interconnected. Furthermore, the flow of oil through the pipes 24 and 27 will be more or less restrained by the relatively small size of these pipes, so that the energy of the shock will be largely dissipated in the interchange of oil itself.

The interconnections between the different corners of the vehicle can be made in different manners. For example, in the arrangement shown in Fig. 4, the units 28 and 29 at the front end of the vehicle are interconnected and the units 30 and 31 at the rear end are interconnected independently thereof. In the arrangement shown in Fig. 5, the front and rear units 28 and 30 at one side of the vehicle are interconnected and the front and rear units 29 and 30 at the other side of the vehicle are interconnected independently thereof. In the arrangement of Fig. 6, the front unit 28 at one side and the rear unit 31 at the other side are interconnected, and the front unit 29 at one side and the rear unit 30 are interconnected independently thereof. In the arrangement of Fig. 7, the interconnections are similar to those of Fig. 6, but other interconnections 32 and 33 are established between the pipes of Fig. 6, so that not only are the diagonally opposite units interconnected, but also the units at either side. Other groupings are possible, and it is not considered necessary to describe them in detail.

In the particular arrangement illustrated in the drawings, the cylinders are shown as being partially filled with oil with an air space in the upper portion of each cylinder, the oil being transferred back and forth through the cross connections.

While I have herein shown and described only certain embodiments of the features of my present invention, still I do not limit myself to the same, except as I may do so in the claims.

I claim:

1. In a vehicle, in combination with a frame member and an axle member, suspension means for opposing side sway movements comprising cylinders connected to one member, fluid-tight double acting pistons co-operating with the cylinders and connected to the other member, and means connecting the top end of one cylinder with the bottom end of another cylinder.

2. In a vehicle, in combination with the frame and axles, suspension means opposing side sway movements comprising cylinders connected to the frame, co-operating fluid-tight double acting pistons connected to the axles, and means connecting the top ends of cylinders at one end of the vehicle with the bottom ends of the other cylinders at the same end.

JOHN B. HAWLEY, Jr.